United States Patent Office 2,895,924
Patented July 21, 1959

2,895,924

PREPARATION OF OXETANE POLYMERS

James A. Hudy, Wilmington, Del., assignor to Hercules Powder Company, Wilmington, Del., a corporation of Delaware No Drawing. Application July 5, 1957
Serial No. 669,950

5 Claims. (Cl. 260—2)

This invention relates to an improved process of bulk polymerizing 3,3-bis(chloromethyl)oxetane in the presence of aluminum alkyl catalysts.

The physical properties of polymers of 3,3-bis(chloromethyl)oxetane, similar to other high polymers, are largely dependent upon the molecular weight of the product. Therefore, the achievement of optimum molecular weight during polymerization is a very important objective. In the course of certain polymerizations of 3,3-bis(chloromethyl)oxetane and particularly for bulk and batch polymerizations of 3,3-bis(chloromethyl)oxetane using aluminum alkyl catalysts, it was found that the objective of optimum molecular weight was difficult and in some instances impossible to obtain. Needless to say, this condition has seriously detracted from the efficacy of the process.

Now, in accordance with this invention, it has been discovered that in the course of bulk polymerization of 3,3-bis(chloromethyl)oxetane with aluminum alkyls at elevated temperatures that pretreatment of the monomer with an insufficiency of catalyst to cause polymerization at a given temperature resulted in a significant increase in the molecular weight of the polymer upon ultimate bulk polymerization. More particularly, the phenomenon here involved is a conditioning of the monomer for subsequent polymerization in contrast to partial polymerization, formation of prepolymer, and incremental addition of catalyst during polymerization. Accordingly, the invention is more aptly defined as a process of bulk polymerizing 3,3-bis(chloromethyl)oxetane in the presence of aluminum alkyl catalyst in which the polymerization is preceded by conditioning of the 3,3-bis(chloromethyl)oxetane with from about 100 to about 1,000 p.p.m. by weight of the aluminum alkyl catalyst at a temperature of from about 25 to about 200° C. and substantially maintaining said 3,3-bis(chloromethyl)oxetane in its monomeric form during said conditioning. The term "bulk polymerizing" as used herein means a polymerization carried out substantially without solvent or diluent.

The following examples will serve to illustrate various embodiments of the invention. All parts and percentages are by weight throughout the specification unless otherwise designated, and where specific viscosity is given it is measured as a 1% solution of the polymer in cyclohexanone at 50° C.

EXAMPLE 1

Polymerization experiments in accordance with this example were carried out in capped crown-top tubes ¾ inch in inside diameter and 4 inches in length. The tubes were sparged with nitrogen before sealing. Catalyst was added by hypodermic syringe from stock solutions of the aluminum alkyl in heptane. The conditions and results of the series of experiments carried out under Example 1 are given in the following table:

Table
EFFECT OF PRETREATMENT OF 3,3-BIS(CHLOROMETHYL)OXETANE WITH ALUMINUM ALKYL CATALYST

| Exp. No. | Catalyst | Pretreatment Conditions | | | Polymerization Conditions | | |
|---|---|---|---|---|---|---|---|
| | | Catalyst Conc. (p.p.m.) | Temp., ° C. | Time of Treatment | Total Catalyst Added (p.p.m.) | Temp., ° C. | Specific Viscosity[1] |
| 1 | Aluminum Triethyl | 0 | Room Temp. | 3 hrs | 196 | 150 | 0.60 |
| 2 | ----do---- | 131 | Room Temp. | 3 hrs | 196 | 150 | 0.91 |
| 3 | ----do---- | 0 | Room Temp. | 21 hrs | 340 | 150 | 0.93 |
| 4 | ----do---- | 209 | Room Temp. | 21 hrs | 340 | 150 | 2.47 |
| 5 | ----do---- | 0 | Room Temp. | 25 hrs | 388 | 150 | 0.98 |
| 6 | ----do---- | 257 | Room Temp. | 25 hrs | 388 | 150 | 1.98 |
| 7 | ----do---- | 0 | 75 | 10 min | 196 | 150 | 0.60 |
| 8 | ----do---- | 131 | 75 | 10 min | 196 | 150 | 1.62 |
| 9 | ----do---- | 0 | 150 | 7 min | 393 | 150 | 0.88 |
| 10 | ----do---- | 262 | 150 | 7 min | 393 | 150 | 1.80 |
| 11 | ----do---- | 0 | 75 | 20 min | 786 | 150 | 1.6 |
| 12 | ----do---- | 786 | 75 | 20 min | 786 | 150 | 2.1 |
| 13 | ----do---- | 0 | 100 | 10 min | 327 | 150 | 0.82 |
| 14 | ----do---- | 327 | 100 | 10 min | 327 | 150 | 1.90 |
| 15 | Aluminum Triisobutyl | 0 | 75 | 10 min | 920 | 200 | 0.73 |
| 16 | ----do---- | 690 | 75 | 10 min | 920 | 200 | 1.20 |
| 17 | ----do---- | 0 | 200 | 3 min | 920 | 200 | 0.98 |
| 18 | ----do---- | 690 | 200 | 3 min | 920 | 200 | 1.38 |

[1] Specific viscosity was measured as a 1% solution of the polymer in cyclohexanone at 50° C.

With reference to the above table, the improvement afforded by the present invention is readily apparent. At the same total catalyst levels throughout, the polymers obtained from the monomers which had been pretreated and conditioned for polymerization gave significantly higher specific viscosities in comparison with the polymers obtained from the monomers which had not been pretreated.

The following examples will further serve to illustrate additional embodiments of the invention and the improvement afforded thereby.

EXAMPLE 2

52.5 pounds of 3,3-bis(chloromethyl)oxetane containing 54 p.p.m. water was placed in a 20-liter glass carboy under a nitrogen blanket. To a 10-milliliter portion of the same monomer in a capped nitrogen-filled tube was added 458 p.p.m. of aluminum triethyl. The tube was immersed in a 150° C. bath and polymerization occurred within 4 minutes. After 10 minutes the polymer was removed and the remaining monomer extracted by molecular distillation. The specfic viscosity of the resulting polymer was 1.06.

To the monomer contained in the carboy was added with stirring 200 milliliters of 0.3 molar aluminum triethyl catalyst in heptane. The resulting mixture was allowed to stand under nitrogen at room temperature for 20 hours. A 10-milliliter portion of this solution was placed in a capped nitrogen-filled tube and tested at 150° C. after the addition of 131 p.p.m. aluminum triethyl catalyst. Polymerization occurred within 4 minutes and the specific viscosity of the resulting extracted polymer was 1.81

EXAMPLE 3

To 13 grams of 3,3-bis(chloromethyl)oxetane contained in a capped, nitrogen-filled tube was added 458 p.p.m. aluminum triethyl catalyst. The tube was immersed in a 150° C. bath and allowed to reach bath temperature. Five minutes after insertion in the bath, an exothermic polymerization resulted. After 10 minutes the polymer was removed from the tube. The resulting product contained 85.9% polymer of specific viscosity 1.18.

To 51.5 pounds of the same monomer contained in a 20-liter glass carboy was added 247 p.p.m. aluminum triethyl catalyst with stirring. The resulting solution was allowed to stand at room temperature for 140 hours. To 13 grams of the treated solution in a capped, nitrogen-filled tube was added 196 p.p.m. aluminum triethyl catalyst. The tube was inserted in a 150° C. bath. After 5¾ minutes an exothermic polymerization resulted. After 10 minutes the polymerization mass was removed from the tube and found to contain 87.1% polymer of specific viscosity 2.19.

EXAMPLE 4

To 117 grams of 3,3-bis(chloromethyl)oxetane contained in a capped bottle under nitrogen was added with stirring 0.90 ml. of 0.15 molar aluminum triethyl catalyst in heptane. Tests at 150° C. indicated this to be insufficient catalyst to cause polymerization. To 13 grams of the solution contained in a capped, nitrogen-filled tube was added an additional 65 p.p.m. of aluminum triethyl catalyst. This mixture resulted in polymerization at 150° C. and a polymer of 0.91 specific viscosity. A similar tube containing 13 grams of the original monomer-catalyst solution was heated at 150° C. for 5 minutes. The addition of an additional 65 p.p.m. aluminum triethyl resulted in polymerization at 150° C. and a polymer of 1.54 specific viscosity.

EXAMPLE 5

To each of two similar capped nitrogen-filled tubes was added 13 grams of 3,3-bis(chloromethyl)oxetane and 327 p.p.m. aluminum triethyl catalyst.

The first tube was immersed in a 150° C. bath and exothermic polymerization occurred within 5 minutes resulting in a polymer of specific viscosity 0.82.

The second tube was heated at 100° C. for ten minutes and subsequently at 150° C. for 7-8 minutes after which exothermic polymerization occurred, resulting in a polymer of specific viscosity 1.92.

EXAMPLE 6

To each of two similar capped, nitrogen-filled tubes was added 13 grams of 3,3-bis(chloromethyl)oxetane. To one tube was added 920 p.p.m. of aluminum triisobutyl catalyst. Subsequent polymerization at 200° C. resulted in a polymer of specific viscosity 0.98.

To the second tube of monomer was added 690 p.p.m. aluminum triisobutyl catalyst. This solution was heated at 200° C. for 3 minutes. Addition of 230 p.p.m. aluminum triisobutyl catalyst resulted in polymerization and a polymer of specific viscosity 1.38.

With reference to the foregoing examples, it will be appreciated that this invention provides a method for achieving a significant increase in the molecular weight of polymers of 3,3-bis(chloromethyl)oxetane by conditioning of the monomer with aluminum alkyl catalyst prior to bulk polymerization. Although the utility of the invention has been demonstrated using triethylaluminum and triisobutylaluminum as catalysts, other preferable catalysts are diethylaluminum chloride and diisobutylaluminum hydride. However, other catalysts suitable in accordance with this invention include tripropylaluminum, trioctylaluminum, tridodecylaluminum, dimethylaluminum chloride, diethylaluminum bromide, ethylaluminum dichloride, dipropylaluminum fluoride, and diisobutylaluminum fluoride. More particularly, the aluminum alkyl catalysts within the purview of this invention have the general formula Al(X)(Y)(Z) wherein X is an alkyl group and Y and Z are members of the class consisting of alkyl, halogen, hydrogen or haloalkyl. The alkyl substituent of the molecule may be straight chain, branched, or alicyclic. Although aluminum alkyls having not more than eight carbon atoms in the (X) alkyl group are preferred, higher aluminum alkyls may be employed.

The amount of catalyst to be utilized based by weight of the monomer may be varied from about 100 to about 1,000 p.p.m. with a pretreatment conditioning temperature of from about 25 to about 200° C. and with preferred conditioning times of 2–3 minutes at 200° C., 10–20 minutes at 75° C., and 12–24 hours at 25° C. Here, it is at once apparent that the conditioning treatment may be carried out in two general ways with substantially the same effect. One procedure concerns conditioning the monomer at a selected temperature using an insufficient catalyst level to cause polymerization. This catalyst level may be determined by actual test or by analytical measurements of the water and hydroperoxide level of the monomer. Generally, the preferred range of catalyst level is from about 30 to about 90% of the catalyst concentration required to completely polymerize the monomer at elevated temperatures which preferably are from about 150 to about 250° C. when employing aluminum alkyl catalysts. The other procedure concerns conditioning the monomer at a sufficient catalyst level to cause polymerization but at a temperature and time interval insufficient to cause any appreciable polymerization whereby the monomer is substantially maintained in its monomeric form. With this procedure, the preferred conditioning times are from 5–30 minutes at 75° C. and from 3–20 minutes at 100° C.

Regardless of the procedure used for conditioning the monomer, the substantial retention of the monomer in its monomeric form is quite essential. This is more readily understood by explanation of the mechanisms indicated as involved, although it is not intended that the invention be limited to any particular theory of operation. The effective increase in molecular weight of the polymer can be explained by either of two mechanisms; involving water as a chain terminator or as a chain transfer agent, since the monomer of 3,3-bis(chloromethyl)oxetane, being somewhat hydroscopic, always contains from 20-100 parts per million of water even after purification. Thus, in the former case, the slow consumption of water by the aluminum alkyl leads to a lesser concentration of the "terminator" and therefore a higher molecular weight product. In the latter case, the decrease in the water concentration by reaction with the alkyl would lead to a lesser number of growing polymer chains and thus a higher viscosity polymer. Accordingly, it is quite advantageous to avoid partial polymerization insofar as possible and to employ the conditioning treatment in such manner that the monomer is substantially maintained in its monomeric form.

The polymers produced from the conditioned monomers of this invention are suitable for the various conventional thermoplastic uses such as molding to form various shaped articles; extrusion to form articles such as film, filaments, sheeting, strip and tubing; calendering to form film, sheeting and coating of paper or fabric; and laminating to form counter tops, industrial board and the like.

It will be seen, therefore, that this invention may be carried out by the use of various modifications and changes without departing from its spirit and scope.

What I claim and desire to protect by Letters Patent is:

1. In the process of bulk polymerizing 3,3-bis(chloromethyl) oxetane in the presence of aluminum alkyl catalyst, the improvement to obtain a significant increase in the molecular weight of the polymer upon polymerization comprising conditioning of the 3,3-bis(chloromethyl)oxetane prior to polymerization with from about 100 to about 1,000 p.p.m. by weight of the aluminum alkyl catalyst at a temperature of from about 25 to about 200° C. under conditions of temperature, time and catalyst level to substantially maintain said 3,3-bis(chloromethyl)oxetane in its monomeric form during said conditioning said time being about 2-3 minutes when said temperature is about 200° C., about 3-20 minutes when said temperature is about 100° C., about 5-30 minutes when said temperature is about 75° C. and about 12-24 hours when said temperature is about 25° C. and thereafter changing the relation between the variables, namely the catalyst level and temperature, by increasing at least one of said variables within the range of about 150° to about 250° C. for the temperature and about 100 to about 1,000 p.p.m. for the catalyst to polymerize said oxetane.

2. The process according to claim 1 in which the aluminum alkyl catalyst is triethylaluminum.

3. The process according to claim 1 in which the aluminum alkyl catalyst is diethylaluminum chloride.

4. The process according to claim 1 in which the aluminum alkyl catalyst is triisobutylaluminum.

5. The process according to claim 1 in which the aluminum alkyl catalyst is diisobutylaluminum hydride.

No references cited.